(12) United States Patent  
Elsom et al.

(10) Patent No.: US 12,029,224 B2  
(45) Date of Patent: Jul. 9, 2024

(54) AUTOMATED CLEAN IN PLACE SYSTEM FOR SOFT SERVE MACHINE

(71) Applicant: H.C. Duke & Son, LLC, East Moline, IL (US)

(72) Inventors: Kyle B. Elsom, Le Claire, IA (US); Michael A. Graef, Naperville, IL (US); Ji Won Elizabeth Oh, Chicago, IL (US); Brian Mathews, Sycamore, IL (US); Gary Paul Almblade, East Moline, IL (US)

(73) Assignee: H.C. Duke & Son, LLC, East Moline, IL (US)

( * ) Notice: Subject to any disclaimer, the term of this patent is extended or adjusted under 35 U.S.C. 154(b) by 183 days.

(21) Appl. No.: 17/068,266

(22) Filed: Oct. 12, 2020

(65) Prior Publication Data

US 2021/0106023 A1  Apr. 15, 2021

Related U.S. Application Data

(60) Provisional application No. 62/913,763, filed on Oct. 11, 2019.

(51) Int. Cl.
| | |
|---|---|
| *A23G 9/30* | (2006.01) |
| *A23G 9/22* | (2006.01) |
| *A23G 9/28* | (2006.01) |
| *B08B 9/032* | (2006.01) |

(52) U.S. Cl.
CPC .............. *A23G 9/30* (2013.01); *A23G 9/228* (2013.01); *A23G 9/28* (2013.01); *B08B 9/0325* (2013.01); *B08B 2203/007* (2013.01); *B08B 2209/032* (2013.01)

(58) Field of Classification Search
CPC . A23G 9/30; A23G 9/228; A23G 9/28; A23G 9/22; B08B 9/0325; B08B 9/027; B08B 2203/007; B08B 2209/032
See application file for complete search history.

(56) References Cited

U.S. PATENT DOCUMENTS

| | | |
|---|---|---|
| 3,898,859 A | 8/1975 | Duke |
| 3,934,759 A | 1/1976 | Giannella et al. |
| 4,848,381 A * | 7/1989 | Livingston ............... B67D 1/07 141/90 |
| 5,799,832 A | 9/1998 | Mayo |
| 6,267,496 B1 | 7/2001 | Rea |

(Continued)

FOREIGN PATENT DOCUMENTS

| | | | | |
|---|---|---|---|---|
| CN | 204719460 U | * | 10/2015 | |
| CN | 109626308 A | * | 4/2019 | ............. B08B 3/102 |

(Continued)

*Primary Examiner* — Emmanuel E Duke
(74) *Attorney, Agent, or Firm* — Dinsmore & Shohl LLP

(57) ABSTRACT

A clean in place assembly for a soft serve ice cream dispenser includes an ice cream dispenser. A clean in place system having a water tank including a heater disposed therein is attached to the ice cream dispenser. A control interface is disposed on the tank. The control interface is connected to operating circuitry of the ice cream dispenser. A nozzle of the ice cream dispenser is formed of a conductive metal material and includes a notch formed therein circumferentially about a portion of the nozzle and includes radiused surfaces that extend to portions of the nozzle that house O-rings.

19 Claims, 12 Drawing Sheets

(56) References Cited

U.S. PATENT DOCUMENTS

| | | |
|---|---|---|
| 7,681,761 B2 | 3/2010 | Harra |
| 10,595,673 B2 | 3/2020 | Tuchrelo et al. |
| 2004/0118291 A1 | 6/2004 | Carhuff et al. |
| 2006/0276932 A1 | 12/2006 | Pearson et al. |
| 2010/0098808 A1* | 4/2010 | Vaghela ............ A23G 9/045 426/279 |
| 2013/0174875 A1* | 7/2013 | Walker ............ B08B 9/027 62/303 |
| 2021/0106023 A1 | 4/2021 | Elsom et al. |

FOREIGN PATENT DOCUMENTS

| | | | | |
|---|---|---|---|---|
| TW | 200418418 A | * | 10/2004 | ............ A47J 31/401 |
| WO | WO-2004058019 A1 | * | 7/2004 | ............ A47J 31/401 |

* cited by examiner

AUTOMATED CLEAN IN PLACE SYSTEM FOR SOFT SERVE MACHINE

CROSS-REFERENCE TO RELATED APPLICATIONS

This application claims priority of U.S. Provisional Application No. 62/913,763 filed Oct. 11, 2019 the contents of which are incorporated herein by reference.

FIELD OF THE INVENTION

The invention relates to a process and apparatus for cleaning a soft serve machine.

BACKGROUND OF THE INVENTION

Soft serve ice cream machines require cleaning, in some cases daily, in order to prevent bacteria growth. These cleaning cycles and their frequencies are mandated by local health codes. The cleaning procedures are developed by the manufacturer and certified by NSF to achieve the required reduction in bacterial count. Execution of the cleaning cycles requires the mechanical breakdown of the food contact areas of the machine to complete the sanitation. This includes the tear down and manual cleaning of the mix delivery system, the freeze cylinders, beater bars and dispense head. Cleaning cycles can occupy one to two employees for up to 1-2 hours. In addition, training and strict adherence to the established cleaning procedures is required to insure the effectiveness of the cleaning cycle. Employee turnover can present challenges to insure an adequate levels of trained employees to conduct the cleaning cycles.

There is therefore a need in the art for an improved cleaning procedure and apparatus to reduce the applied labor, and to improve the consistency and effectiveness of a cleaning cycle. There is a need for a unit to be cleaned without a mechanical breakdown of the machine, resulting in significant reductions in labor and improved consistency of the clean cycle.

SUMMARY OF THE INVENTION

In one aspect, there is disclosed a clean in place assembly for a soft serve ice cream dispenser that includes an ice cream dispenser. A clean in place system having a water tank including a heater disposed therein is attached to the ice cream dispenser. A control interface is disposed on the tank. The control interface is connected to operating circuitry of the ice cream dispenser.

In another aspect, there is disclosed a method of sanitizing an ice cream dispenser comprising the steps of: providing an ice cream dispenser, providing a clean in place system, the clean in place system including a water tank including a heater disposed therein and a control interface disposed on the tank, the control interface connected to operating circuitry of the ice cream dispenser; performing a set up procedure; performing a rinse cycle preparation cycle; performing a rinse cycle; performing a heat preparation cycle wherein water in the tank is recycled in the tank and the heater is activated heating the water in the tank to a temperature of from 160 to 185 degrees Fahrenheit; and performing a heat cycle wherein the heated water is cycled to the ice cream dispenser for a predetermined amount of time sanitizing the ice cream dispenser.

In a further aspect, there is disclosed a clean in place assembly for a soft serve ice cream dispenser that includes an ice cream dispenser. A clean in place system having a water tank including a heater disposed therein is attached to the ice cream dispenser. A control interface is disposed on the tank. The control interface is connected to operating circuitry of the ice cream dispenser. A nozzle of the ice cream dispenser is formed of a conductive metal material and includes a notch formed therein circumferentially about a portion of the nozzle and includes radiused surfaces that extend to portions of the nozzle that house O-rings.

DETAILED DESCRIPTION OF THE PREFERRED EMBODIMENTS

Figure 1:
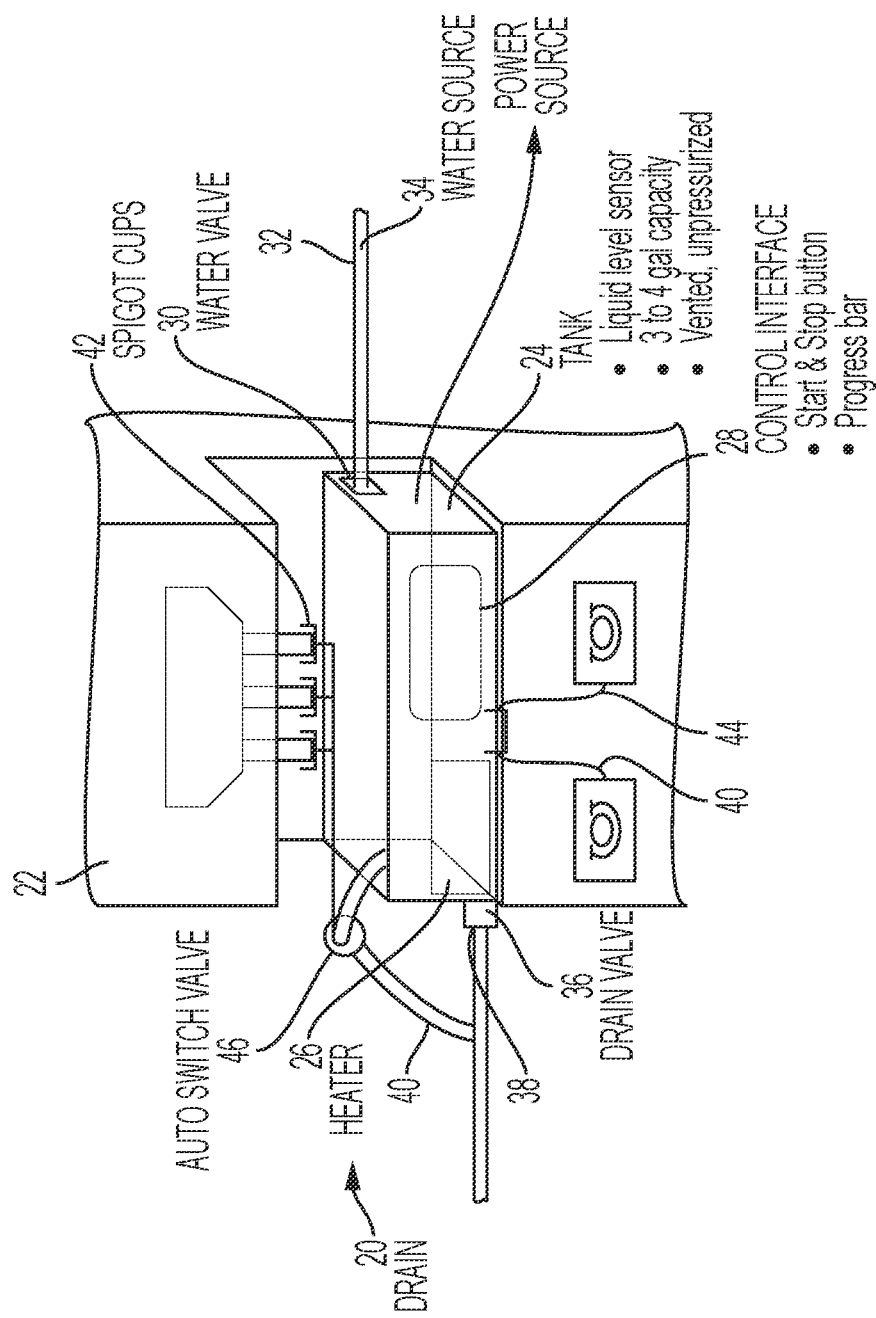
FIG. 1 is a graphical depiction of a clean in place system.

Referring to FIG. 1 there is shown a clean in place (CIP) system 20 for an ice cream dispenser 22. The CIP system 22 includes a tank 24 that has a heater 26 disposed therein. A control interface 28 is provided on the tank 24 to allow various functions of the system such as a start and stop as well as status of the system. The control interface 28 links to the operating circuitry of the ice cream dispenser allowing the CIP system 20 to control the various components of the ice cream dispenser 22 as will be discussed below.

The tank 24 includes a water inlet 30 having a water valve 32 that is coupled to a water source 34. The tank 24 includes a drain valve 36 at an outlet 38 of the tank 24. Connections 40 are connected to the outlet 38 to mate with the spigots 42 of the ice cream dispensing machine as well as the mixing bag interface 44. A switch valve 46 may be positioned in the connections 40. The tank 24 includes a power connection 48 to a power source for the heater 26, as well as the control interface 28.

In one aspect, the control interface 28 integrates with the controls of the ice cream dispensing machine and specifically with the freezer controls. This integration enables the automation of the clean in place CIP cycle after minimal setup is performed, minimizing applied labor. Pump cycles, beater activations, are all controlled via the CIP controller interface 28 to the machine. This system integration also enables the implementation of machine lockouts such as the inability to dispense frozen product if clean cycles are not performed per required schedules. Clean cycle logs can also be generated.

The CIP system 20 utilizes hot water to improve the integrity of the clean cycle. Temperatures in excess of 150 F will effectively eliminate bacteria. This is optimal compared with trying to cover all surfaces with sanitizer. Sanitizer may also be used with the clean in place system, but more to augment than as a primary cleaning agent.

Figure 2:
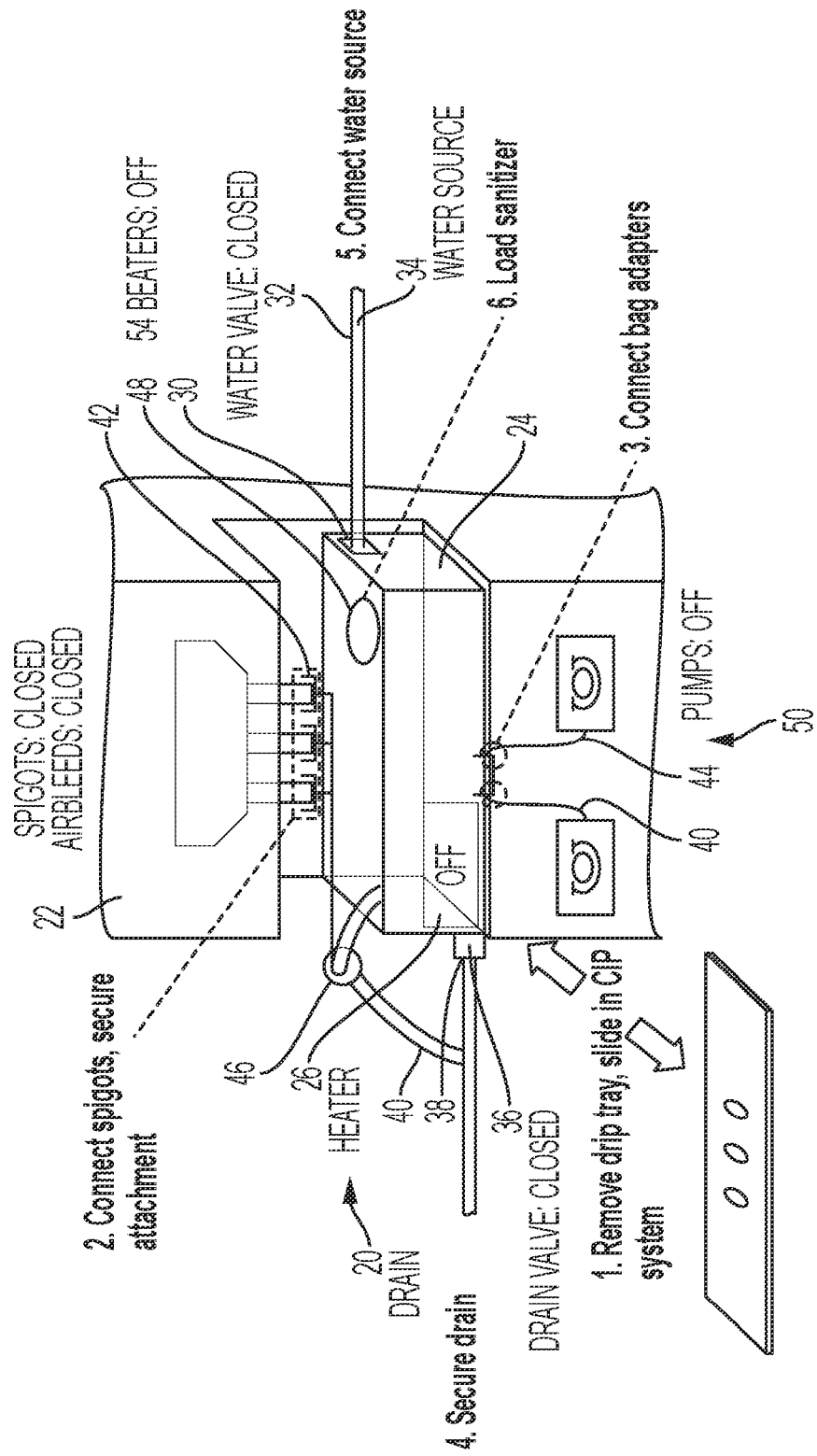
FIG. 2 is a graphical depiction of a clean in place system at initial setup.

Referring to FIG. 2, the setup of the CIP system 20 is shown. The system is turned to a clean mode and ice cream product is dispensed from the barrels of the ice cream dispenser 22. The drip tray is removed from the ice cream dispenser 22 and the tank 24 is installed. The mix lines are disconnected from product bags. The connections 40 are attached to the spigot 42. The connections 40 are attached to the bag adapters 44 and to the outlet 38 of the tank 24. A water source 34 is connected to the inlet 30 of the tank 34 and sanitizer 48 is loaded into a compartment in the tank 24. A power source is coupled to the CIP system 20.

Figure 3:
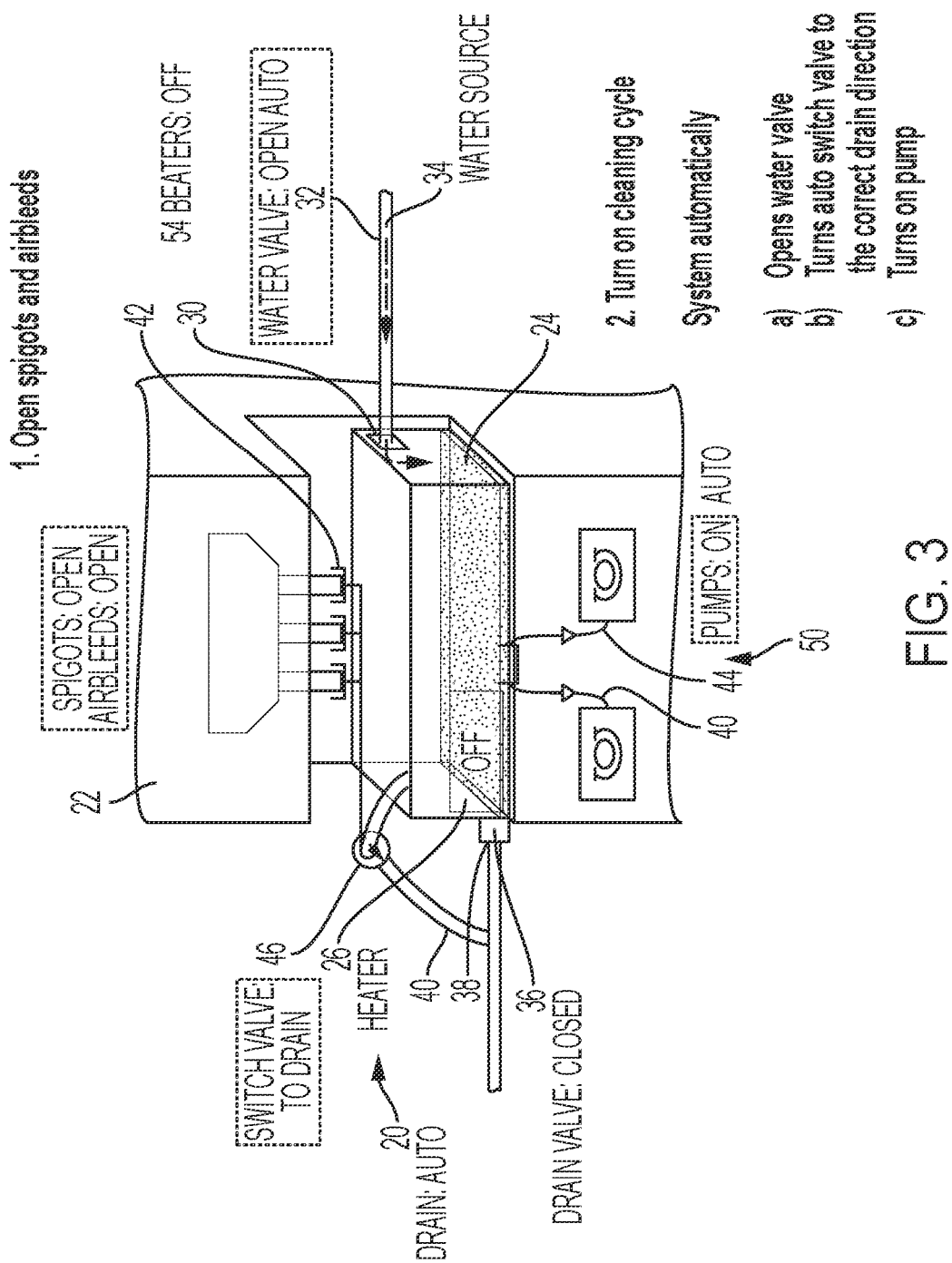
FIG. 3 is a graphical depiction of a clean in place system at rinse cycle preparation.

Referring to FIG. 3, the rinse cycle prep is shown. The spigots 42 and air bleed lines are opened. Water is allowed to enter the tank 24 through the inlet 30 into the tank 24 and a valve 36 at the outlet 38 of the tank 24 is closed. The pumps 50 associated with the ice cream dispenser 22 are turned on and water flows to the bag connections 44.

Figure 4:
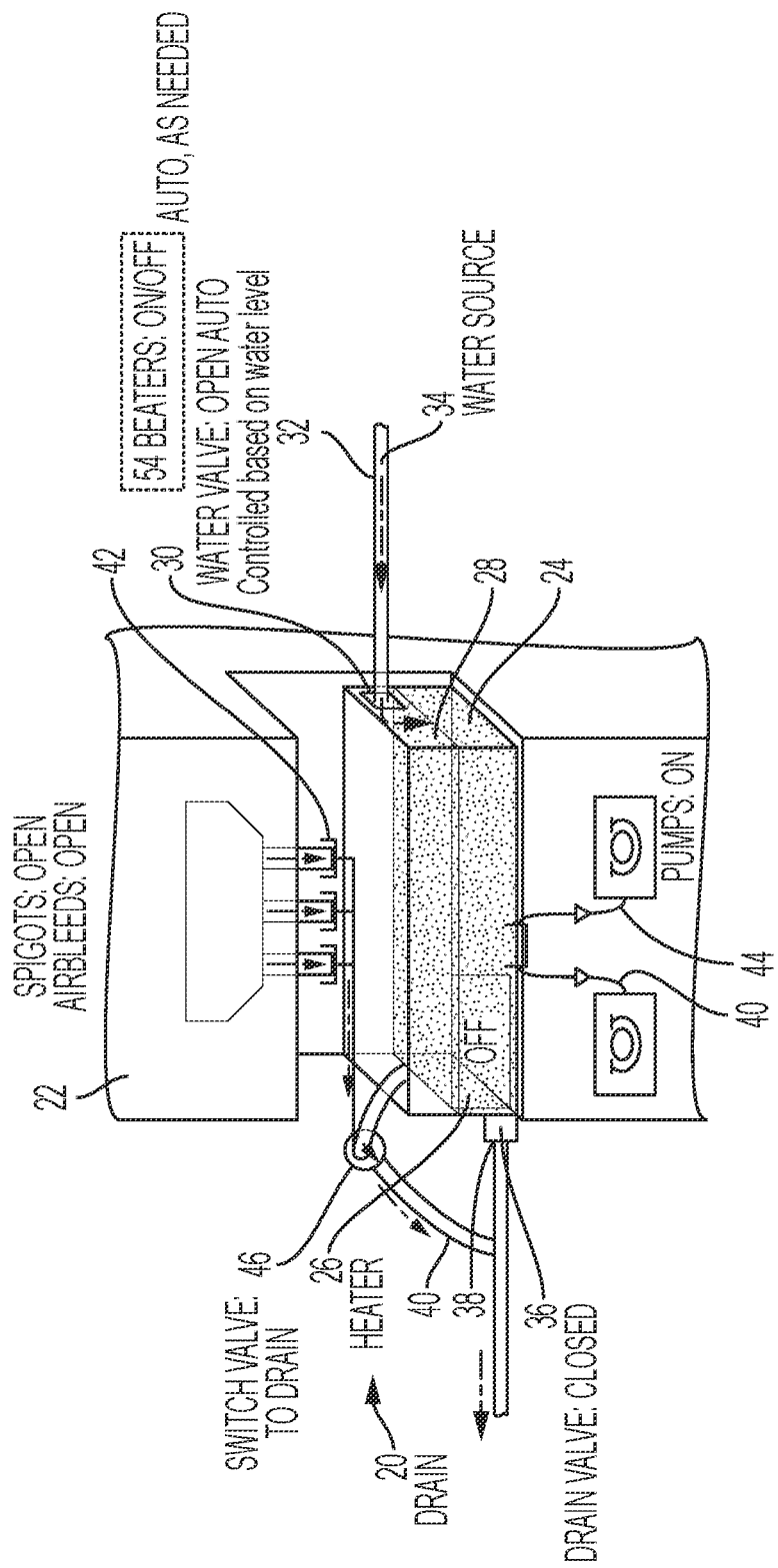
FIG. 4 is a graphical depiction of a clean in place system at a rinse cycle.

Referring to FIG. 4, the rinse cycle is shown. Water flows from the tank 24 through the bag connections 44 through the pumps 50 of the ice cream dispenser 22 to the cylinders and out through the spigots 42. The connections 40 at the spigots 42 direct the water to the switch valve 46 which routes the water to a drain 52. The beaters 54 of the ice cream dispenser 22 may be enabled or disabled as needed. The water runs through the system from 10 to 15 minutes until the water runs clear. In one aspect, the water may optionally be preheated by the heater to about 120 F and sanitizer may optionally be included in the water.

Figure 5:
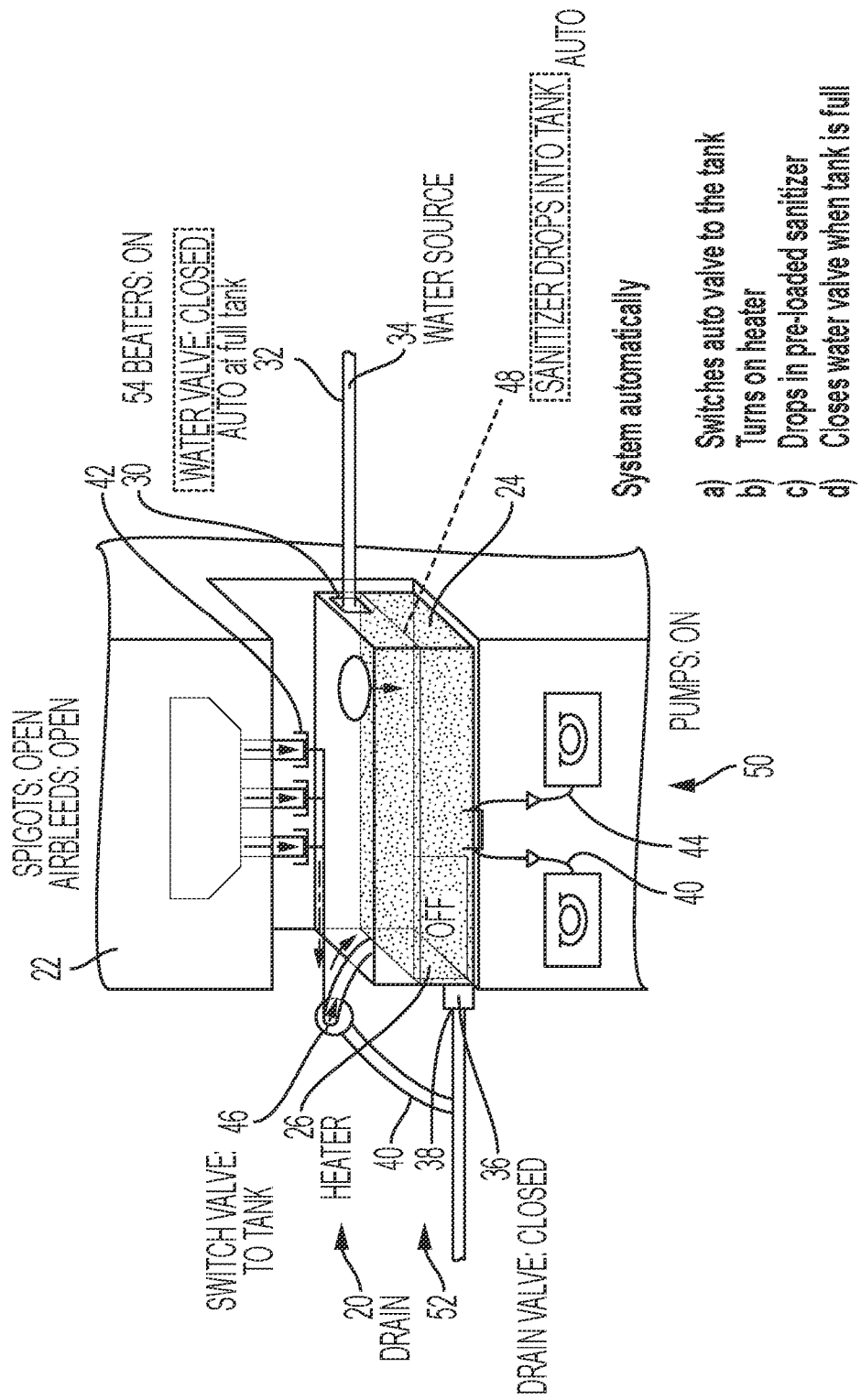
FIG. 5 is a graphical depiction of a clean in place system at a heat cycle preparation.

Referring to FIG. 5, the heat prep cycle is shown. The water valve at the tank inlet 30 is closed and the water level in the tank 24 is full. The heater 26 is turned on in the tank 24 and sanitizer may or may not be added 48 is added to the water in the tank 24. The switch valve 46 is moved to cycle water back to the tank 24 from the spigots 42.

Figure 6:
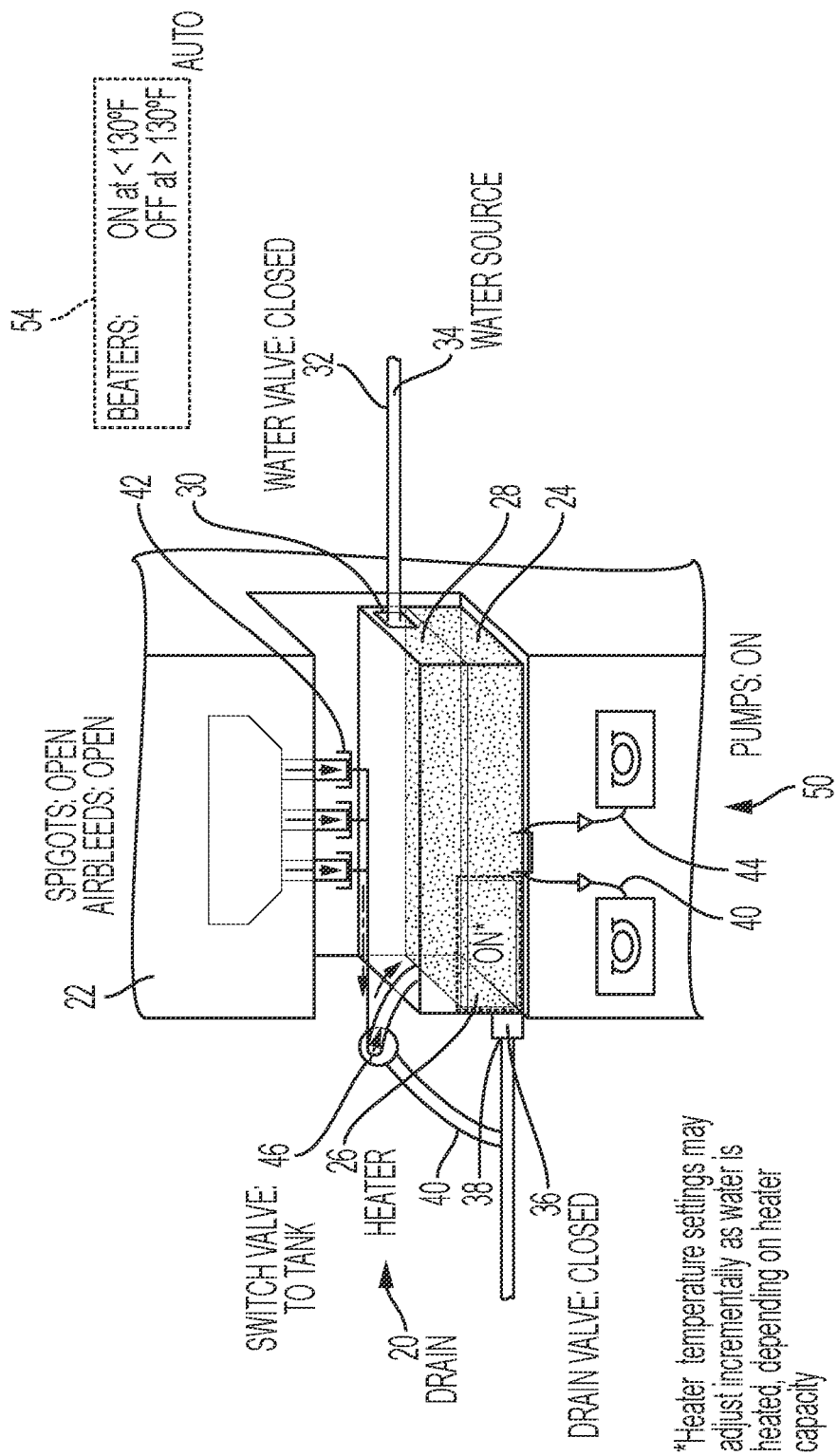
FIG. 6 is a graphical depiction of a clean in place system at a heat cycle.

Referring to FIG. 6, the heat cycle is shown. Water is heated from 160 to 185 F in the tank 24 which forms a closed loop with the ice cream dispenser 22. The heated water flows through the ice cream dispenser 22 for a predetermined amount of time such as 40 minutes such that the surfaces of the ice cream dispenser 22 are heated to specified level. The beaters 54 of the ice cream dispenser 22 may be enabled or disabled as needed.

Figure 7:
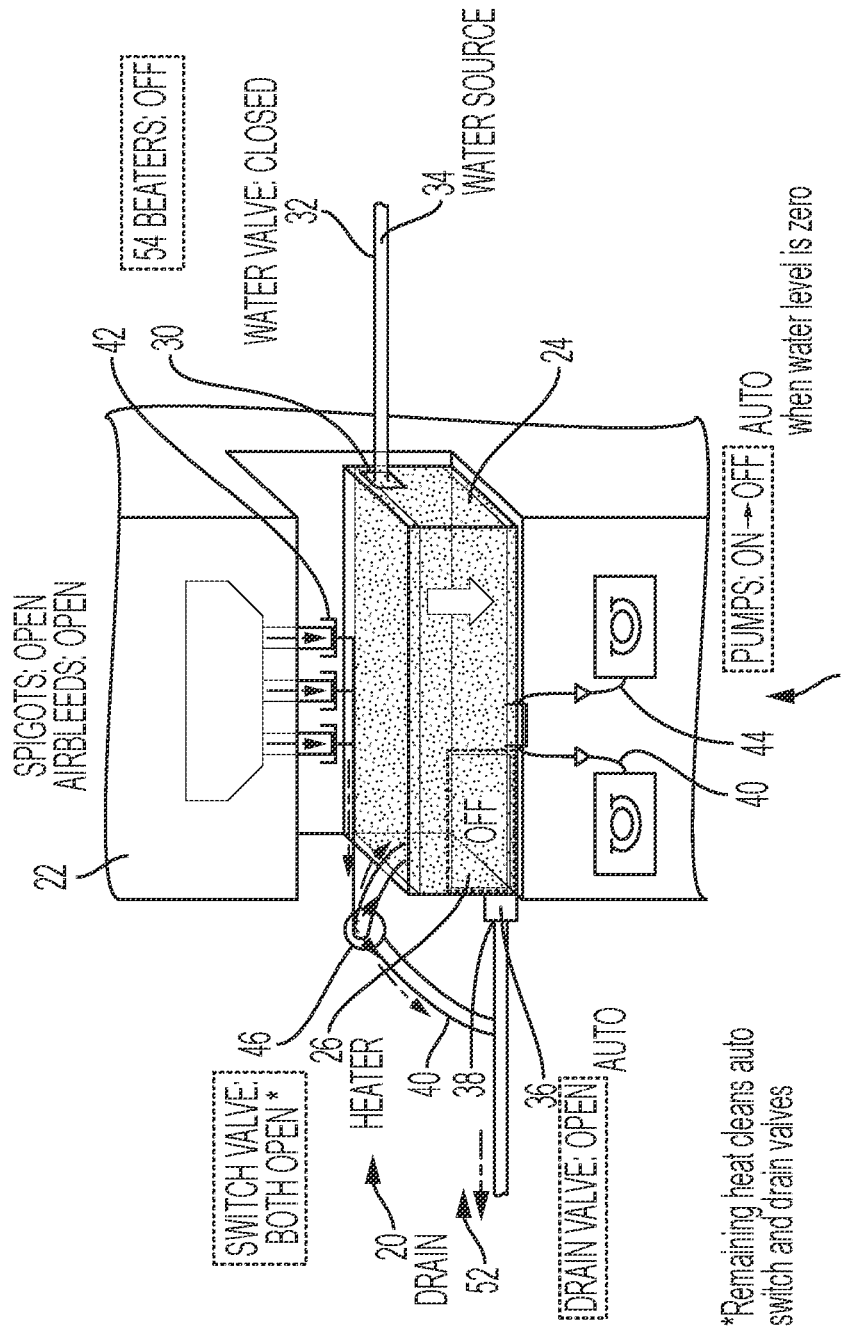
FIG. 7 is a graphical depiction of a clean in place system at a drain period.

Referring to FIG. 7, the drain cycle is shown. The water valve at the inlet 30 of the tank 24 is closed. The heater 26 is deactivated and the switch valve 46 is actuated to the drain 52 and the tank 24. The drain valve to the tank is opened. The pumps 50 are run until all of the water has been removed from the tank 24.

Figure 8:
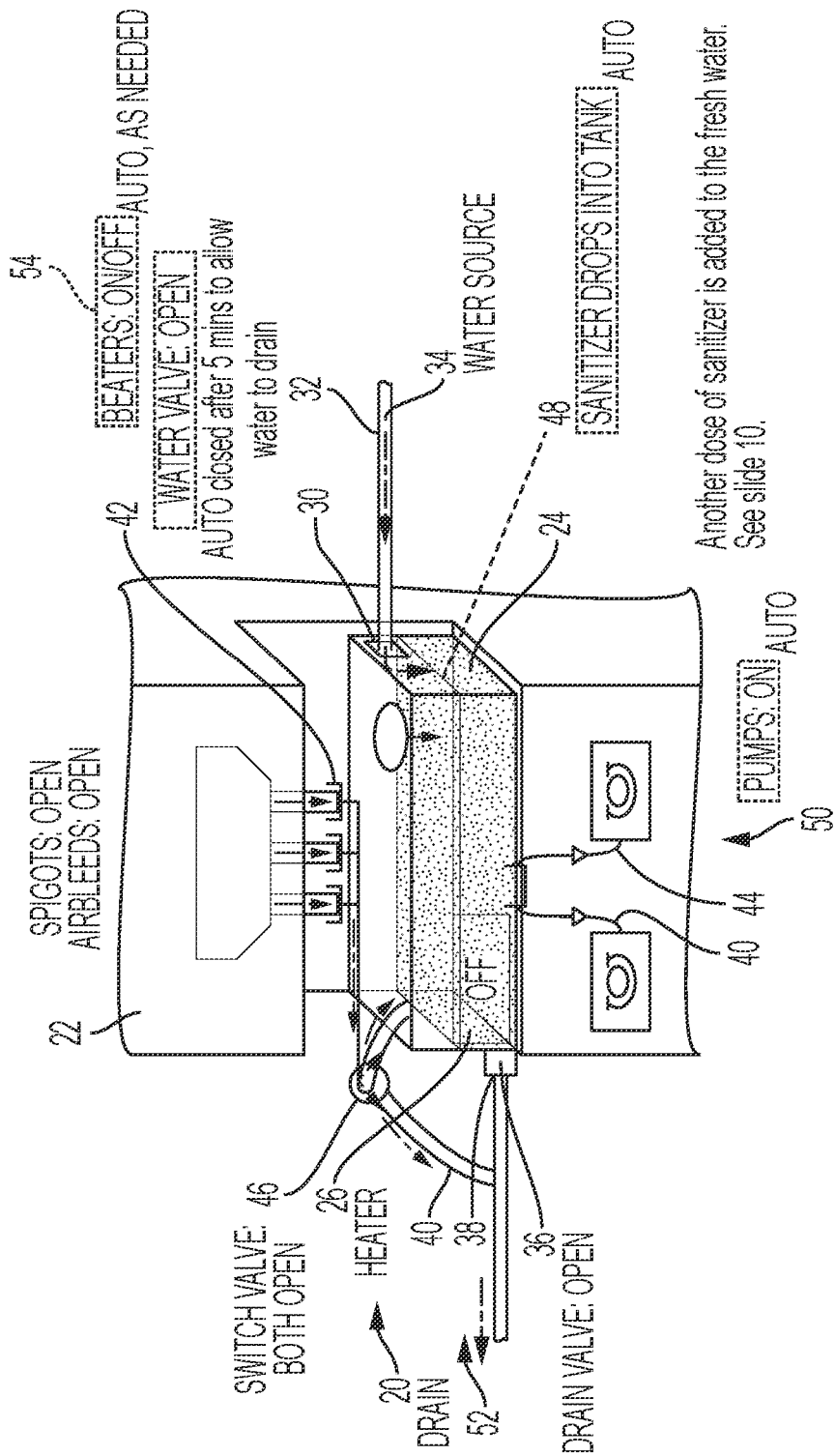
FIG. 8 is a graphical depiction of a clean in place system at a final rinse and cooling.

Referring to FIG. 8 an optional final rinse and cooling cycle is shown. The water valve at the inlet 30 of the tank 24 is opened and water enters the tank 24 for a specified amount of time until the tank is full. Sanitizer 48 may be added to the water. The switch valve 46 is actuated to the drain 52. The pumps 50 of the ice cream dispenser 22 are on and water flows through the ice cream dispenser 22 to cool the components to room temperature. The water may flow for a predetermined amount of time such as 10 minutes.

Figure 9:
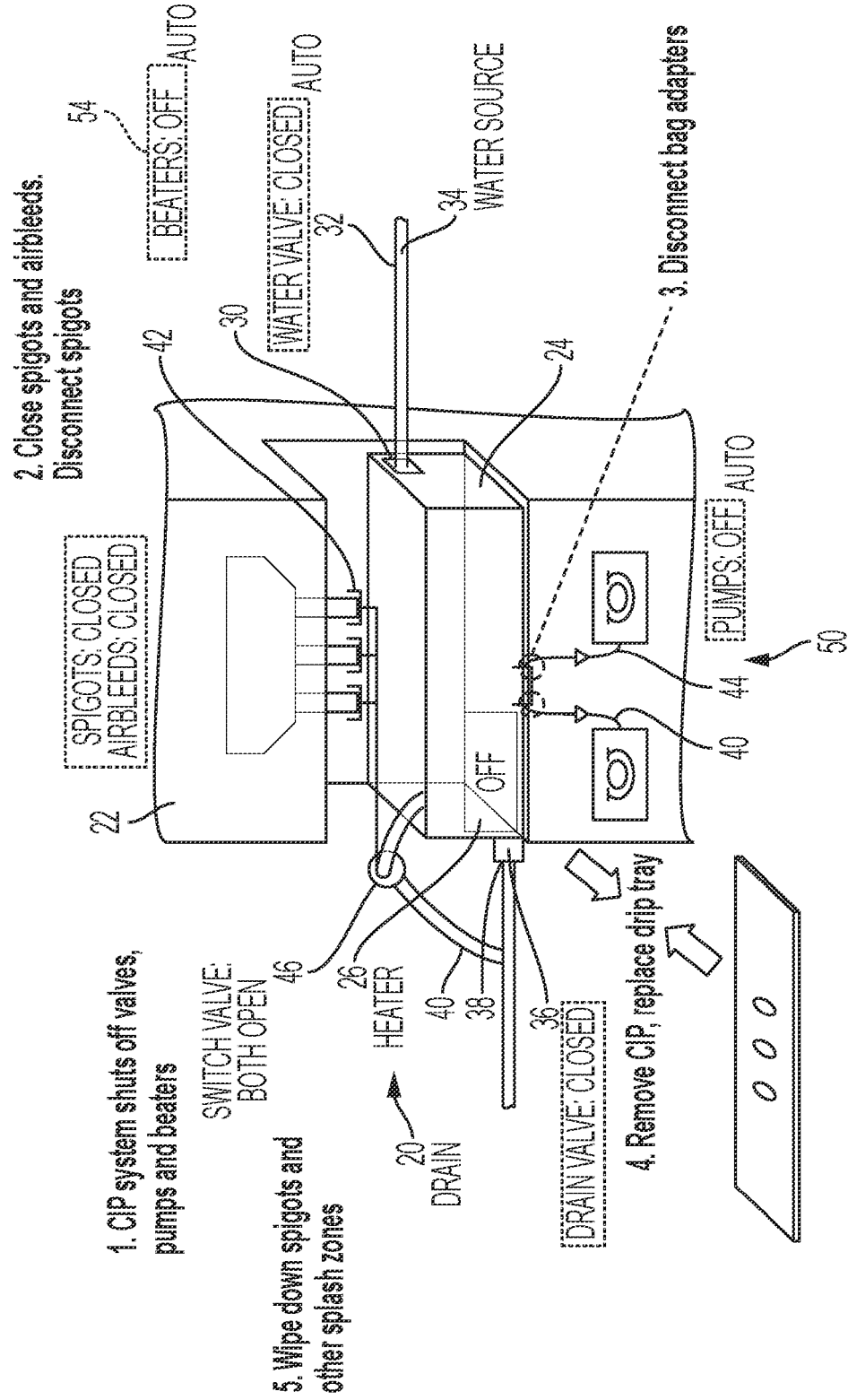
FIG. 9 is a graphical depiction of a clean in place system at a dismount time.

Referring to FIG. 9, the dismounting of the CIP system 20 is shown. The CIP system 20 shuts off the valves pumps and beaters. The spigots 42 and air bleeds are closed and the connections 40 are removed. The connections 40 at the bag adapters 44 are also removed. The tank 24 is then removed and the drip tray is reinstalled. Various splash zones may be wiped down.

The CIP system 20 will utilize power utilities from the ice cream dispenser 22 to support a self-contained heater module. This enables the CIP system to utilize tap water to supply the CIP system and generate hot water. This provides for an elevated rinse temperature cycle, 110-120 F, and for a sanitize cycle, 150-160 F water. The utilization of hot water in combination with the pump circuits from the freezer enables a frozen product cycle start. The prior art machines require the product to be liquefied before initiating a cleaning cycle. This can take up to 4 hours to accomplish, which constrains the store operator around cleaning operations. The use of hot water provides a superior sanitation cycle to that of chemical based sanitation. Once a uniform system temperature is reached for a pre-determined time, an effective sanitation cycle had been accomplished. This compares to chemical based sanitize cycles, which rely on water agitation and chemical contact of all surfaces to insure effective bacteria elimination.

Figure 10:
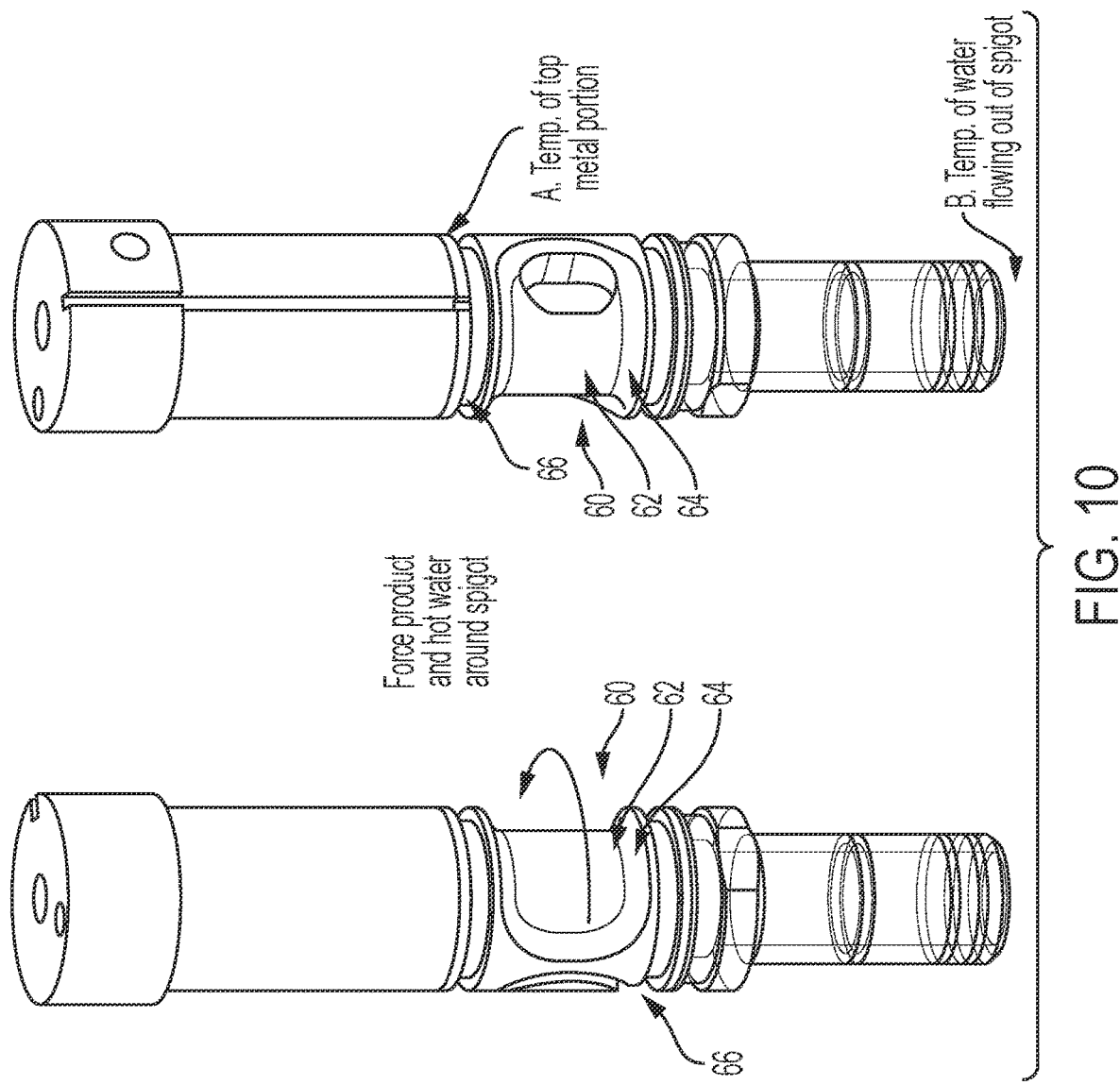
FIG. 10 is perspective views of a dispense nozzle including geometry allowing flow in a clean cycle.
Figure 11:
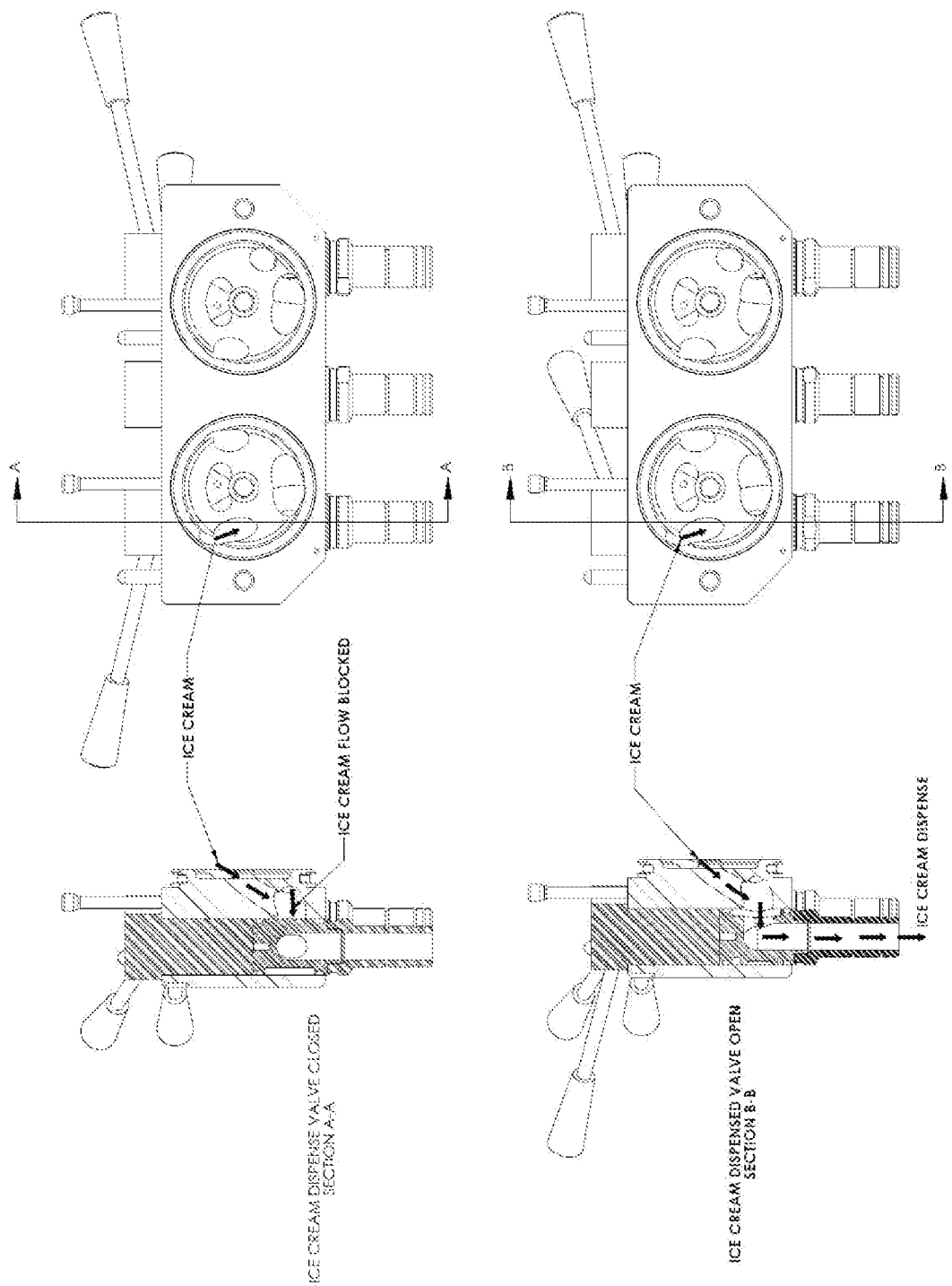
FIG. 11 is front and section views of the nozzle and an ice cream dispensing machine showing the nozzle in open and closed positions.
Figure 12:
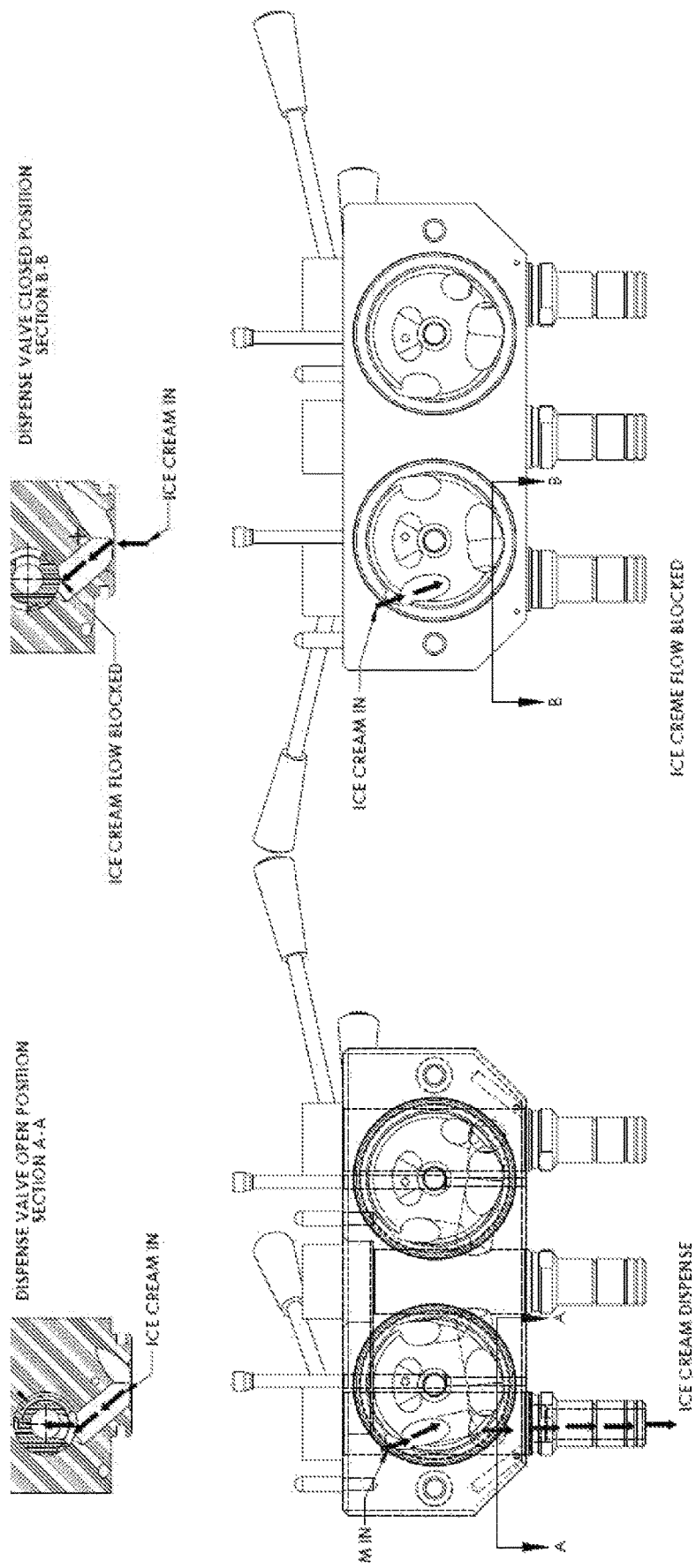
FIG. 12 is front and section views of the nozzle and an ice cream dispensing machine showing the nozzle in open and closed positions.

Referring to FIGS. 10-12, there is shown a nozzle 60 of an ice cream dispenser 22. The nozzle 60 is formed of a metal that can conduct heat. The nozzle 60 includes a notch 62 formed therein circumferentially about a portion of the nozzle 60. The notch 62 includes radiused surfaces 64 that extend to the portions of the nozzle that house O-rings 66. The notch 62 forces the frozen ice cream product or the cleaning water to flow around the spigot 42 allowing cleaning without multiple nozzle actuations. The nozzle 60 is actuated by rotation to allow flow or block flow as shown in FIGS. 11 and 12.

The ability to clean in place without removing or repeatedly activating plungers or nozzles is an advantage over the prior art. One of the more difficult areas to clean and sanitize are the dispense plungers. The plungers have O-rings, and are susceptible to mix getting trapped. These areas are difficult to clean. Prior art accomplished cleaning this area by rinsing and repeated activations of the plunger to purge any mix from trapped areas or requires removal of the plungers during the cleaning process and manually cleaning them. Both of these solutions add applied labor and manual processes which can affect the repeatability of a CIP process. To eliminate this, the nozzle having the notch described above enables the plunger to be cleaned with a single activation. The end user simply opens the plunger, and the CIP cycle is completed without having to remove or further activate.

The invention claimed is:

1. A clean in place assembly for a soft serve ice cream dispenser comprising:
   an ice cream dispenser including a nozzle wherein the nozzle of the ice cream dispenser is formed of a conductive metal material;
   a clean in place system having a water tank including a heater disposed therein;
   a control interface disposed on the tank, the control interface connected to operating circuitry of the ice cream dispenser.

2. The clean in place assembly for the soft serve ice cream dispenser of claim 1 wherein the tank includes a water inlet having a water valve coupled to a water source and the tank including a drain valve at an outlet of the tank.

3. The clean in place assembly for the soft serve ice cream dispenser of claim 1 including connections coupled to the outlet and the connections coupled to spigots of the ice cream dispenser and the connections coupled to a mixing bag interface of the ice cream dispenser.

4. The clean in place assembly for the soft serve ice cream dispenser of claim 3 including a switch valve positioned in the connections.

5. The clean in place assembly for the soft serve ice cream dispenser of claim 1 wherein the tank includes a power connection, the power connection coupled to a power source for the heater and the power connection coupled to the control interface.

6. The clean in place assembly for the soft serve ice cream dispenser of claim 1 wherein the control interface integrates with the controls of the ice cream dispenser and the freezer controls of the ice cream dispenser.

7. The clean in place assembly for the soft serve ice cream dispenser of claim 1 including a lock out mechanism disposed in the ice cream dispenser, the lock out mechanism connected to the control interface.

8. The clean in place assembly for the soft serve ice cream dispenser of claim 1 further including a compartment formed in the tank, the compartment including sanitizer disposed therein.

9. A method of sanitizing an ice cream dispenser comprising the steps of:
providing an ice cream dispenser including a nozzle wherein the nozzle of the ice cream dispenser is formed of a conductive metal material;
providing a clean in place system, the clean in place system including a water tank including a heater disposed therein and a control interface disposed on the tank, the control interface connected to operating circuitry of the ice cream dispenser;
performing a set up procedure;
performing a rinse cycle preparation cycle;
performing a rinse cycle;
performing a heat preparation cycle wherein water in the tank is circulated in the tank and the heater is activated heating the water in the tank to a temperature of from 160 to 185 degrees Fahrenheit;
performing a heat cycle wherein the heated water is cycled to the ice cream dispenser for a predetermined amount of time sanitizing the ice cream dispenser.

10. The method of claim 9 wherein the setup procedure includes the steps of:
coupling the clean in place system to the ice cream dispenser;
disconnecting mix lines from product bags of the ice cream dispenser;
attaching connections to an outlet of the tank;
attaching connections to bag adapters of the ice cream dispenser;
attaching connections to a spigot of the ice cream dispenser;
connecting a water source to an inlet of the tank; and
connecting a power source to the clean in place system.

11. The method of claim 9 wherein the set up procedure includes the step of loading sanitizer into a compartment of the tank.

12. The method of claim 9 wherein the rinse cycle preparation cycle includes the steps of:
opening spigots and air bleed lines of the ice cream dispenser;
feeding water to the tank through an inlet into the tank;
closing a valve at an outlet of the tank;
turning on pumps associated with the ice cream dispenser flowing water to bag connections of the ice cream dispenser.

13. The method of claim 9 wherein the rinse cycle includes the steps of:
flowing water from the tank through bag connections through pumps of the ice cream dispenser to cylinders and out through spigots;
directing connections at the spigots routing the water to a switch valve and to a drain;
enabling and disabling beaters of the ice cream dispenser.

14. The method of claim 9 wherein the heat preparation cycle includes the steps of:
closing a water valve at an inlet of the tank;
activating the heater;
moving a switch valve cycling water to the tank from spigots of the ice cream dispenser.

15. The method of claim 9 wherein the heat preparation cycle further includes adding sanitizer to the water.

16. The method of claim 9 further including a drain cycle including the steps of:
closing a water valve at an inlet of the tank;
deactivating the heater;
actuating a switch valve to a drain and the tank;
opening a drain valve to the tank;
running pumps until all of the water has been removed from the tank.

17. The method of claim 9 further including a final rinse cycle including the steps of:
opening a water valve at an inlet of the tank;
actuating a switch valve to a drain;
running pumps of the ice cream dispenser flowing water through the ice cream dispenser cooling the ice cream dispenser to room temperature.

18. The method of claim 9 wherein the rinse cycle further includes heating the water to a temperature of from 110 to 120 degrees Fahrenheit.

19. A clean in place assembly for a soft serve ice cream dispenser comprising:
an ice cream dispenser wherein a nozzle of the ice cream dispenser is formed of a conductive metal material and includes a notch formed therein circumferentially about a portion of the nozzle and including radiused surfaces that extend to portions of the nozzle that house O-rings;
a clean in place system having a water tank including a heater disposed therein;
a control interface disposed on the tank, the control interface connected to operating circuitry of the ice cream dispenser.

* * * * *